US012652281B2

(12) United States Patent
Brinkhoff et al.

(10) Patent No.: US 12,652,281 B2
(45) Date of Patent: Jun. 9, 2026

(54) USING A NATIVE LOGIN SCREEN TO LOG IN TO AN ALTERNATE SYSTEM

(71) Applicant: Microsoft Technology Licensing, LLC, Redmond, WA (US)

(72) Inventors: Christiaan Brinkhoff, Woodinville, WA (US); Sandeep Patnaik, Kirkland, WA (US); William Scott Stauber, Seattle, WA (US); Patrick Joseph Derks, Seattle, WA (US); Tyler Kien Beam, Seattle, WA (US); Alexander Ryan Fromm, Woodinville, WA (US); Prasanna Chromepet Padmanabhan, Redmond, WA (US); Jinhua Fei, Bellevue, WA (US); Andrew Ho Yin Miyasato, Kirkland, WA (US); Amar Dinesh Zavery, Redmond, WA (US); Shilpa Satyen Lulla, Hyderabad (IN); Siddharth, Bengaluru (IN); Ajitkumar Jatanlal Surana, Hyderabad (IN); Naveen Krishnan Ramasamy, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 18/131,015

(22) Filed: Apr. 5, 2023

(65) Prior Publication Data

US 2024/0340280 A1     Oct. 10, 2024

(51) Int. Cl.
H04L 9/40          (2022.01)
G06F 9/451         (2018.01)
(52) U.S. Cl.
CPC ............ H04L 63/083 (2013.01); G06F 9/452 (2018.02)

(58) Field of Classification Search
CPC ........ H04L 63/083; H04L 67/08; G06F 9/452
See application file for complete search history.

(56) References Cited

U.S. PATENT DOCUMENTS

| 11,567,646 B1 | 1/2023 | Deore |
| 2009/0210934 A1* | 8/2009 | Innes ...................... H04L 63/08 726/7 |

(Continued)

FOREIGN PATENT DOCUMENTS

WO          2009102915 A2     8/2009

OTHER PUBLICATIONS

International Search Report and Written Opinion received for PCT Application No. PCT/US2024/022434, mailed on Jul. 29, 2024, 09 pages.

(Continued)

*Primary Examiner* — Catherine Thiaw
*Assistant Examiner* — Nega Woldemariam
(74) *Attorney, Agent, or Firm* — Workman Nydegger

(57) ABSTRACT

Techniques for integrating the access to a virtual desktop with a local device's operating system (OS) are disclosed. Providing this integration enables a streamlined, highly convenient process for accessing the virtual desktop via the local device, thereby providing a "login-to-cloud" mode. The system displays a login screen, which is native to the system's OS. User credentials for the virtual desktop are received at the login screen. These credentials are used to identify the user and user's corresponding virtual desktop. A stream of an image of the virtual desktop is then received and displayed. Therefore, despite the virtual desktop residing in the cloud environment, the virtual desktop can still be directly accessed via the native login screen of the local device.

20 Claims, 9 Drawing Sheets

Architecture
100

(56) References Cited

U.S. PATENT DOCUMENTS

| | | | | |
|---|---|---|---|---|
| 2010/0125905 | A1* | 5/2010 | Samuels | G06F 3/04886 |
| | | | | 726/16 |
| 2011/0185292 | A1* | 7/2011 | Chawla | G06F 9/5077 |
| | | | | 709/227 |
| 2013/0007465 | A1* | 1/2013 | Movassaghi | G06F 21/34 |
| | | | | 713/185 |
| 2015/0082239 | A1* | 3/2015 | Zhao | H04L 67/565 |
| | | | | 715/788 |
| 2017/0206861 | A1* | 7/2017 | Rojas | G06F 3/0482 |
| 2017/0221046 | A1* | 8/2017 | Mikuriya | G06Q 20/36 |
| 2017/0257215 | A1* | 9/2017 | Huang | H04L 67/141 |
| 2019/0132381 | A1* | 5/2019 | Momchilov | G06F 3/0481 |
| 2020/0027160 | A1* | 1/2020 | Sogawa | G06Q 40/04 |
| 2020/0228632 | A1* | 7/2020 | Lugschitz | H04L 67/146 |
| 2020/0394063 | A1* | 12/2020 | Kelly | G06F 9/452 |
| 2021/0349745 | A1* | 11/2021 | Kelly | G06F 8/63 |
| 2024/0340280 | A1* | 10/2024 | Brinkhoff | G06F 9/452 |

OTHER PUBLICATIONS

"Windows 365 Integration into Windows 11 Demonstrated", Retrieved from: https://www.youtube.com/watch?v=rkkxTcV56b8&t=105s, Apr. 5, 2022, 4 Pages.

Flores, et al., "Configure your Company Branding", Retrieved from: https://learn.microsoft.com/en-us/azure/active-directory/fundamentals/customize-branding, Mar. 16, 2023, 7 Pages.

Matarazzo, et al., "Set up a Shared or Guest Windows Device", Retrieved From: https://learn.microsoft.com/en-us/windows/configuration/set-up-shared-or-guest-pc?tabs=intune#maintenance-and-sleep, Feb. 14, 2023, 4 Pages.

Pamnani, et al., "PassportForWork CSP", Retrieved from: https://learn.microsoft.com/en-us/windows/client-management/mdm/passportforwork-csp, Mar. 2, 2023, 49 Pages.

Pamnani, et al., "Personalization CSP", Retrieved from: https://learn.microsoft.com/en-us/windows/client-management/mdm/personalization-csp, Mar. 2, 2023, 4 Pages.

Pamnani, et al., "Policy CSP—ADMX_ControlPanelDisplay", Retrieved from: https://learn.microsoft.com/en-us/windows/client-management/mdm/policy-csp-admx-controlpaneldisplay#admx-controlpaneldisplay-cpl-personalization-forcedefaultlockscreen, Jan. 27, 2023, 30 Pages.

Pamnani, et al., "Policy CSP—ADMX_Desktop", Retrieved from: https://learn.microsoft.com/en-us/windows/client-management/mdm/policy-csp-admx-desktop#admx-desktop-wallpaper, Jan. 27, 2023, 39 Pages.

Pamnani, et al., "Policy CSP—Authentication", Retrieved From: https://learn.microsoft.com/en-us/windows/client-management/mdm/policy-csp-authentication#authentication-enablefastfirstsignin, Jan. 27, 2023, 9 Pages.

International Preliminary Report on Patentability (Chapter I) received for PCT Application No. PCT/US2024/022434, mailed on Oct. 16, 2025, 6 pages.

* cited by examiner

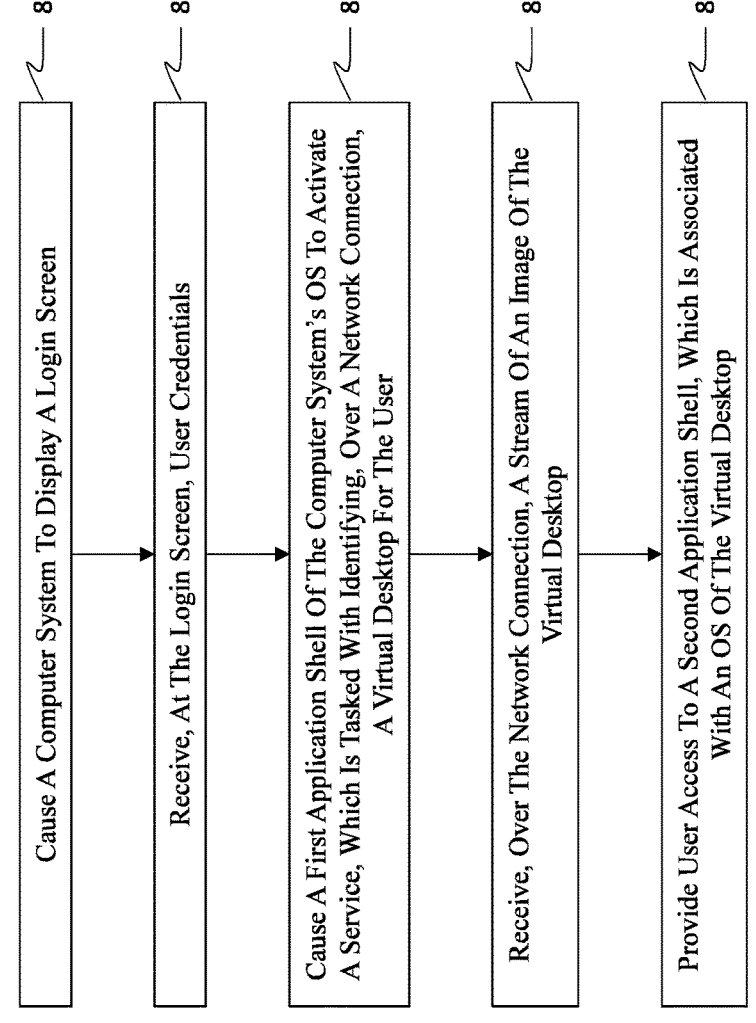

800

Cause A Computer System To Display A Login Screen — 805

Receive, At The Login Screen, User Credentials — 810

Cause A First Application Shell Of The Computer System's OS To Activate A Service, Which Is Tasked With Identifying, Over A Network Connection, A Virtual Desktop For The User — 815

Receive, Over The Network Connection, A Stream Of An Image Of The Virtual Desktop — 820

Provide User Access To A Second Application Shell, Which Is Associated With An OS Of The Virtual Desktop — 825

*Figure 8*

USING A NATIVE LOGIN SCREEN TO LOG IN TO AN ALTERNATE SYSTEM

BACKGROUND

There are various forms of computing, including local and remote computing. One type of remote computing is referred to as "cloud computing." Cloud computing generally refers to a technique for providing real-time delivery or access to various remote computing services, infrastructure, and/or computing resources.

With conventional systems, a user logs into their personal or local computer device with a first set of credentials to access the various resources of their local device. Then, only after the user has logged into their local device with their first set of credentials, the user can subsequently log into a subscription for cloud services by entering a second set of credentials that are associated with the cloud services. By way of example, the user can access a cloud services portal or application interface on their local device, after first logging into their local device, to enter a second set of credentials that are associated with their cloud services subscription. Then, after entering their second set of credentials into the portal or application interface, the user is finally provided access to the various resources made available by the cloud services through a virtual desktop or virtual machine that operates remotely from the local device.

As used herein, the phrase "virtual machine" or "virtual desktop" refers to a computing resource that relies on abstracted software instead of a physical computer in order to deploy and execute other software programs. Such remote configurations can also be referred to more broadly as "alternate systems" and can include any type of virtual machine, virtual desktop, or any other remote computing system that is accessible through a local device. In such instances, the user's local and physical device is effectively operating as a dummy terminal interface for the remote virtual machine or virtual desktop provided by the remote cloud services.

By way of an example, the user's local device can stream an image of the virtual desktop on the physical display of the local device. In such scenarios, the compute, memory, and other computing operations performed by the virtual desktop are primarily performed in the cloud, remotely from the user's local device; the local device is primarily being used just as a streaming device to visualize the virtual desktop. That said, many features of the user's local device can also be used to support and supplement the processes and data being used in the virtual desktop.

As indicated above, the cloud service providing the virtual desktop provides an experience designed to mimic the experience the user would have if the user were interacting only with his/her local device. That experience brings with it a number of different benefits. For instance, the virtual desktop can now be managed quite easily from an information technology (IT) perspective. Another benefit deals with easily scaling compute requirements, memory, and other resources.

As a brief aside, a local device accessing a virtual desktop or even the virtual desktop itself should be considered as being distinct relative to a computer capable of operating in a so-called "kiosk mode." Generally, "kiosk mode" refers to an OS feature that selectively controls a device so that the device is able to run a single application, akin to a sandbox mode. Stated differently, kiosk mode can be used to control or otherwise lock down a device so that the device can be used for only a selected task. Kiosk mode is typically built on top of or is integrated with the OS's shell (i.e. the graphical user interface or outermost layer of the OS). Thus, a computer running in kiosk mode should be viewed as being different than a virtual desktop for various reasons, one of which is that a computer running in kiosk mode is heavily restricted in its overall operations while a virtual desktop is not. Additionally, the virtual desktop is associated with remote resources that are only available through a virtual session that is enabled after a user enters a set of credentials to log into their virtual desktop experience, and which conventionally only occurs after the user first logs into their local device with a different set of credentials. This is very unlike a kiosk mode that is configured to operate with local resources in a single manner, independent of the login credentials that are provided.

As noted previously, the conventional manner in which a user gains access to his/her virtual desktop is as follows. First, the user logs on to his/her local device. Once logged on, the user navigates to an application dashboard that allows the user to access the virtual desktop. The user then enters his/her credentials to gain access to that virtual desktop. The virtual desktop experience is then streamed to the user's local device. In this regard, traditional techniques require the implementation of multiple sequential login sessions, each being associated with different sets of unique credentials. This can create confusion and unnecessary delay for users attempting to log into their virtual desktops. For at least these reasons, there is an ongoing need and desire for new and improved methods and systems for enabling users to log into their virtual desktops to access remote cloud services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for configuring a login screen, which is native to an operating system (OS) of the computer system, to enable a user to access a virtual desktop that is residing in a cloud environment with a single login process without requiring multiple sequential login session (e.g., without requiring a user to first log into their local device with a first set of credentials prior to logging into a virtual session with a second set of credentials).

In some instances, a user is beneficially enabled to access a virtual desktop directly from their local device's login screen, without requiring the user to first log in through the login screen to their local desktop to access a subsequent login screen for the virtual desktop, and resulting in a reduction in the number of steps that are required to access the virtual desktop, thereby improving the overall efficiency of the computer system when providing access to the virtual desktop and improving the overall user experience.

In some embodiments, the computer system is configured to receive credentials for the virtual session directly through the login screen that is displayed for accessing the local desktop and which is native to the OS of the computer system. From the native login screen, a user can enter user credentials for accessing the local device (e.g., local desktop) or, alternatively, a different set of credentials that correspond directly to a virtual desktop. In particular, to access the virtual desktop from the display screen that is native to the OS of the computer system, the user enters user credentials that are specific for the virtual desktop associated with the user who entered the user credentials.

Then the system uses the user credentials associated with the virtual desktop that are entered into the native desktop login screen to identify, over a network connection, the virtual desktop for the user. Upon validating the user's credentials, the virtual desktop session is initiated for presentation to the user through the local device, even though the virtual desktop actually resides remotely in the cloud environment.

Disclosed embodiments also include receiving, over the network connection, a stream of an image of the virtual desktop, which resides in the cloud environment but which was accessed via the computer system's login screen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 7 and 8 illustrate various flowcharts of example methods for configuring a login screen to enable a device to connect, from that login screen, with a virtual desktop.

DETAILED DESCRIPTION

Figure 1:
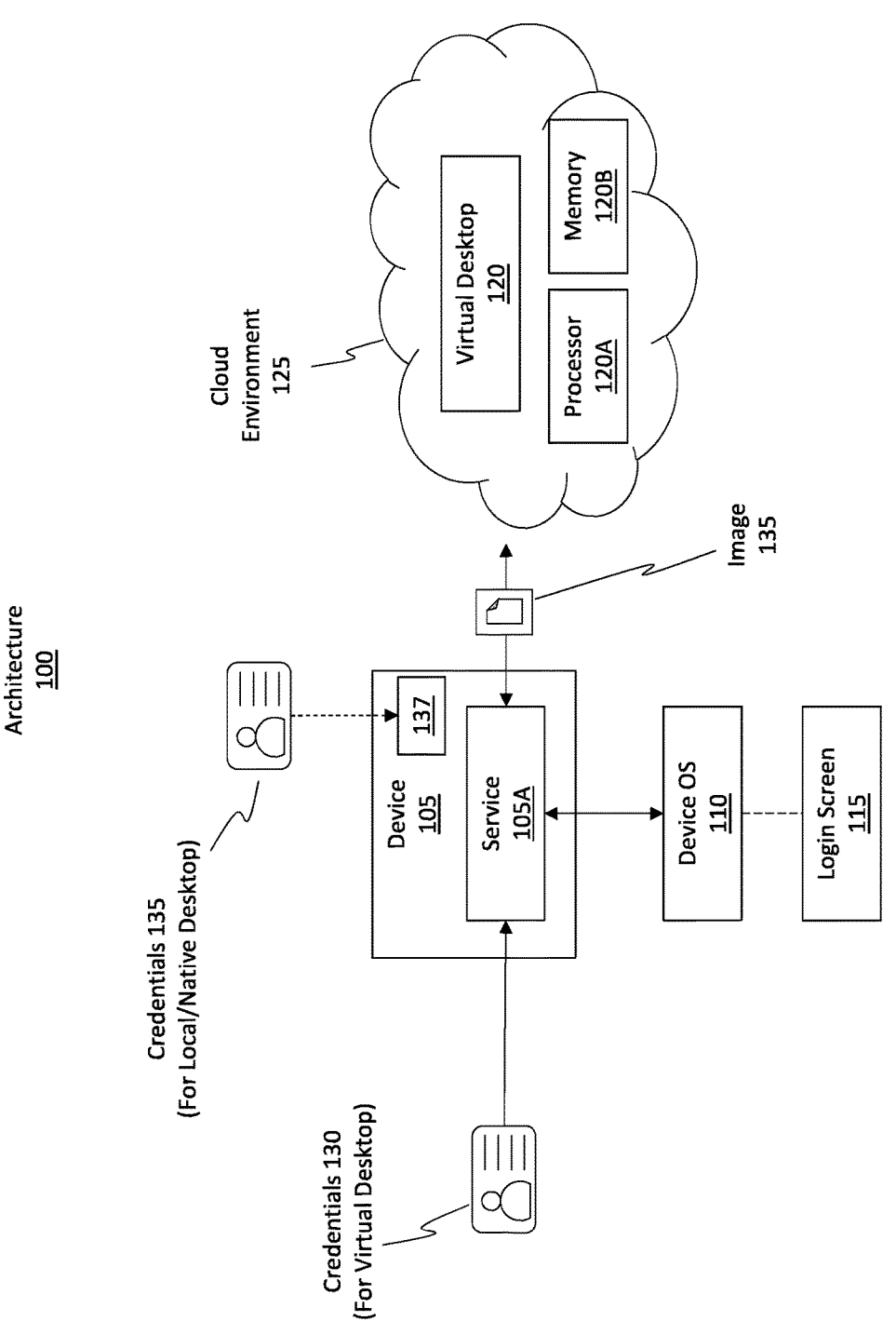
FIG. 1 illustrates an example architecture that can be used to connect to a virtual desktop from the native login screen of a computer system.

Embodiments disclosed herein relate to systems, devices, and methods that beneficially integrate the access to a virtual desktop with a local device's operating system (OS) to enable a streamlined, highly convenient technique for accessing the virtual desktop via the local device's login screen.

In effect, the embodiments beneficially provide a technique to "login-to-cloud." Stated differently, the embodiments facilitate the orchestration of the local operating environment with the remote operating environment so that they behave to the user as one during the initial login process. In other words, the embodiments attempt to present a scenario where the local experience and the cloud experience are viewed as being the same, single experience during the login process. By "login-to-cloud," it is meant that the embodiments provide a mechanism for connecting with a virtual desktop, where that connection is triggered based on an action that occurs at a login screen that is native to a device not hosting the virtual desktop.

Some embodiments cause the computer system to display the login screen, which is native to the system's OS. As used herein, the term "native" refers to a computing function, feature, interface, application, or any other computing aspect that is designed to operate on a specific platform, such as an operating system. Thus, an operating system typically includes a login screen that is native to that operating system. User credentials are received at the login screen. The user credentials are used to identify, over a network connection, the user's corresponding virtual desktop. A stream of an image of the virtual desktop is received over the network connection. Therefore, despite the virtual desktop residing in the cloud environment, the virtual desktop can still be accessed via the computer system's login screen.

Some embodiments display a login screen that is native to the system's OS. User credentials are received at the login screen. When the entered credentials correspond to a local desktop, the system validates the credentials and provides the user access to their local desktop. Alternatively, when the user credentials correspond to a virtual session or service, the system interfaces with a remote service to validate the credentials and to provide access to a virtual desktop for the validated credentials associated with the virtual desktop.

In some instances, a first application shell of the computer system's OS activates the service tasked with identifying, over a network connection, the virtual desktop and for validating the user's credentials to the virtual desktop. Once the virtual session is instantiated, after validating the user's virtual session credentials, a stream of an image of the corresponding virtual desktop is received over the network connection. The user then interacts with a second application shell, which is associated with an OS of the virtual desktop, to control interactions with the virtual desktop. This interaction occurs using a remote connection that exists between the computer system and the virtual desktop and that was established as a result of the user entering the validated user credentials for the virtual session at the login screen that is native to the local device.

Examples of Technical Benefits, Improvements, and Practical Applications

The following section outlines some example improvements and practical applications provided by the disclosed embodiments. It will be appreciated, however, that these are examples only and that the embodiments are not limited to only these improvements.

The disclosed embodiments bring about numerous benefits, advantages, and practical applications to the technical field of cloud computing and, in particular to scenarios involving virtual desktop infrastructures (VDI). As one example, the embodiments are able to provide an experience that replicates or mimics how users are accustomed to accessing or logging into a local device, yet the device those users are actually logging into is a virtual desktop that is executing in a cloud environment, which is remote relative to the local device. Stated differently, the embodiments improve how a user interacts with a computer system when that user's objective is to log into his/her virtual desktop.

With traditional VDI implementations and even with kiosk mode implementations, users were required to perform numerous different steps (e.g., multiple log in actions) to access their virtual desktops, where these steps created friction on the part of the user. For instance, that friction often involved users having to launch additional client applications or to perform other highly complex actions to access the virtual sessions. Another benefit over kiosk mode is that the integration with the device's local shell enables the embodiments to display a more integrated transition user experience that smoothly delivers the user to the final streaming virtual desktop interface with a single set of login credentials that can be entered at the first stage of interaction with the user's local device (e.g., at the initial login screen that is native to the local device).

The disclosed embodiments provide streamlined login processes that require fewer actions to access virtual desktop resources. Stated differently, the efficiencies of both the user and of the computer system are often improved because fewer user-facing actions are performed to access that user's virtual desktop.

By implementing the disclosed principles, it will typically be the case that a user will not discern any difference in actions or procedures with regard to logging into that user's physical computer or to that user's virtual desktop, other than the different credentials that are provided, as the credentials are entered in the same places. As a beneficial consequence, users will be able to easily adopt the disclosed techniques because the underlying operations are hidden from the user, yet the user is greatly benefitted because the user can now more easily access his/her virtual desktop with a single login process, rather than requiring multiple login processes and/or without requiring the user to first launch a separate portal or interface to enter their virtual session credentials into.

Whereas the traditional techniques required the use of multiple, discrete login sessions, each of which were visible to the user, the disclosed embodiments beneficially eliminate a user-perceivable difference between those sessions. Now, the user sees what appears to be a single login session used to access his/her virtual desktop. Accordingly, these and numerous other benefits will now be described in more detail throughout the remaining sections of this disclosure.

Example Architecture

Having just described some of the various high level benefits provided by the disclosed embodiments, attention will now be directed to FIG. 1, which shows an example architecture 100 that can be used to achieve those benefits. Architecture 100 shows a device 105 that includes a service 105A. Device 105 can be any type of device, including any type of personal computer (PC), mobile device, tablet, and so on.

As used herein, the term "service" refers to an automated program that is tasked with performing different actions based on input. In some cases, service 105A can be a deterministic service that operates fully given a set of inputs and without a randomization factor. In other cases, service 105A can be or can include a machine learning (ML) or artificial intelligence engine.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 105A is typically a local service implemented on a PC or computing device. In some instances, service 105A can be a hybrid type of service that includes a local component operating on a local system and a cloud component operating in a cloud environment.

In any event, service 105A is able to communicate and potentially augment an OS of the local device, as represented by device OS 110. For instance, service 105A can modify various register keys used by the device OS 110. Furthermore, service 105A can cause an application programming interface (API) and/or a client application to be implemented with or alongside of the device OS 110. In some instances, the service 105A can also be referred to as a client application.

Device OS 110 may include a shell application. As used herein, the phrase "shell application" or simply "shell" refers to a program or application that exposes the device's OS to another program or application to enable that other application to access the OS in various different ways. The shell can also be thought of as the outermost layer of the device's OS.

The service 105A can communicate with the shell. Service 105A can be tasked with performing various operations related to connecting with a virtual desktop, as will be discussed in more detail later. In this regard, service 105A can cooperate and communicate with the device's OS, and in particular with the OS's shell, and can perform various actions with regard to connecting with a remote virtual desktop.

The device OS 110 includes a login screen 115, where a user enters his/her credential information for logging into the local device desktop (e.g., when the local device credentials are entered) and/or for logging into a virtual desktop (e.g., when the virtual desktop credentials are entered).

Notably, the login screen 115 is local or native to the device's OS, which is conventionally only used to receive credentials for logging into the local desktop. In accordance with the disclosed principles of the current invention, however, the login screen 115 that is native to the local device is configured for enabling a user to enter his/her virtual desktop credentials in the login screen 115 and to be able to cause the device to connect with that user's virtual desktop, which resides in a cloud environment, without first logging into the local desktop with local login credentials. Thus, the user can enter one set of credentials (e.g., credentials corresponding to a virtual desktop) into the local or native login screen 115, and the computer system can be triggered to directly connect with that user's virtual desktop, and without requiring the user to first log into their local desktop with a different set of credentials.

Architecture 100 shows a virtual desktop 120 residing in a cloud environment 125. The virtual desktop 120 is able to utilize any number of processors or memory provided in the cloud environment 125, as shown by processor 120A and memory 120B. The user is able to enter his/her credentials 130, which are credentials associated with the virtual desktop 120, into the login screen 115. The service 105A then streams an image 135 of the virtual desktop 120 for display on the device 105. The user is then provided with a seemingly local experience of interacting with a computer system, but the computer system the user is interacting with is a virtual system that is operating in the cloud environment 125.

Alternatively, if the user wants to log into their local desktop 137, they can do that by entering credentials 135, which correspond to the local desktop of the device 105. Accordingly, it will be appreciated that at single entry point or login screen exists for a user to alternatively log into either their virtual desktop or their local desktop, based on which set of credentials they enter into that login screen.

Figure 2:
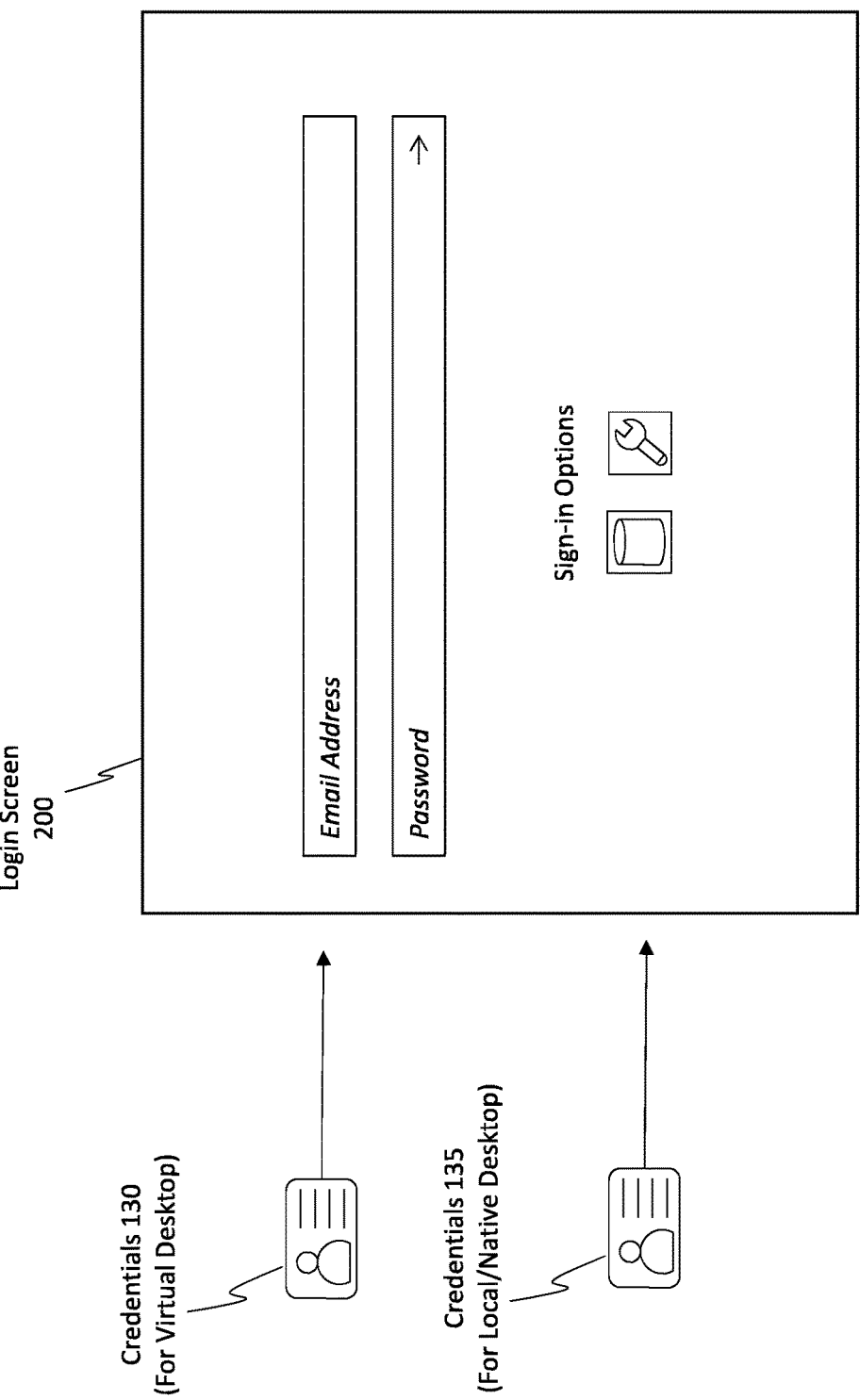
FIG. 2 illustrates an example of a login screen.

FIG. 2 shows an example of a login screen 200. Login screen 200 may be representative of the login screen 115 of FIG. 1. The user can enter his/her credentials in the login screen 200. The credentials entered can include credentials 130, for accessing the virtual desktop, or credentials 135 for accessing the local or native desktop. In some instances, those credentials (130/135) include a username and password. For instance, for credentials 130, if the user has an already-provisioned or pre-provisioned virtual desktop, then the user might have existing credentials that may be used to connect to that pre-provisioned virtual desktop.

In other instances, credentials 130 may include a license code or a quick response (QR) code. For instance, it may be the case that the user does not have a pre-provisioned virtual desktop. In such a scenario, the user may purchase a license code. The user can then enter the license code into the login screen 200. Entering this license code into the login screen 200 can operate as a triggering mechanism to provision (on-demand) a virtual desktop for the user.

Figure 3:
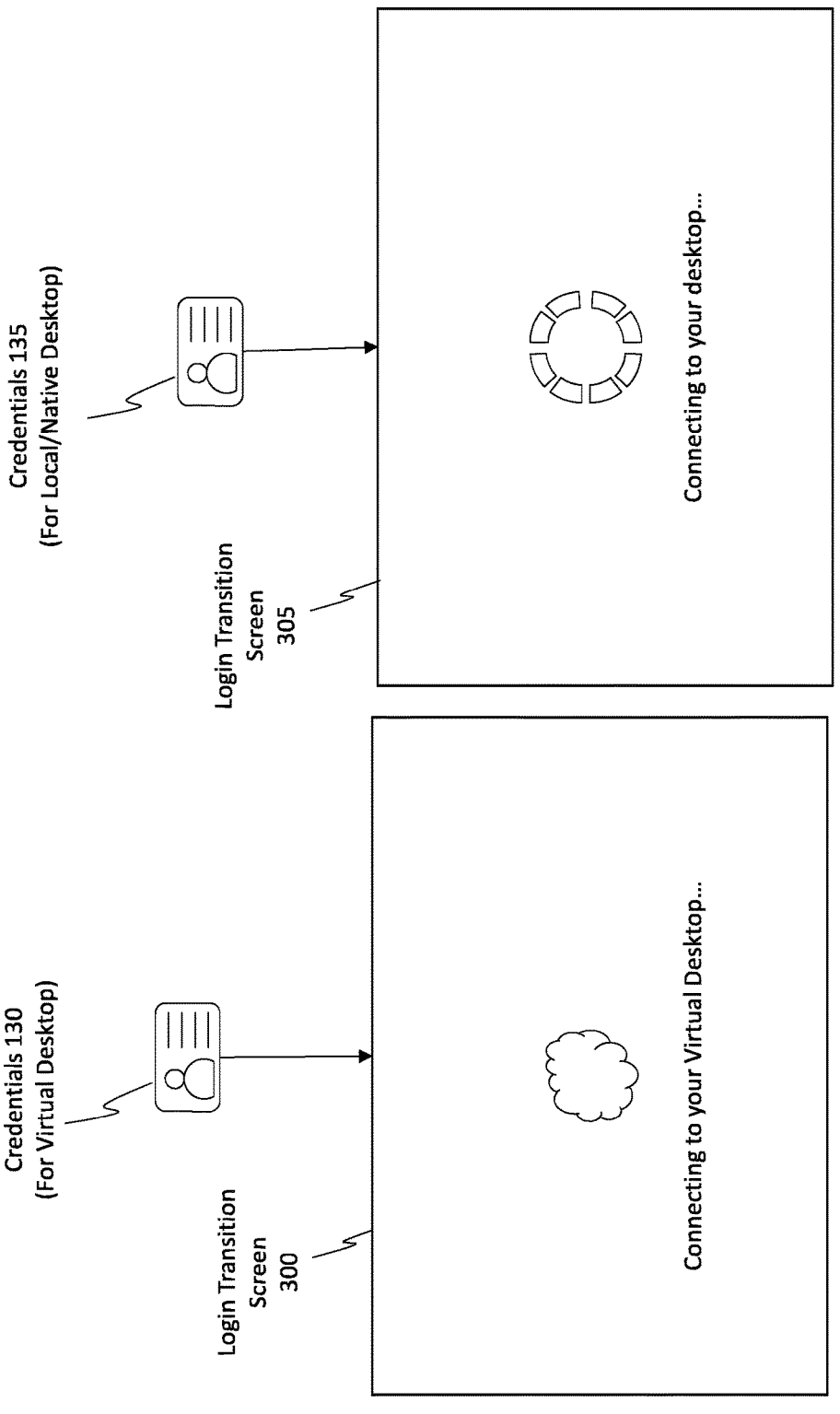
FIG. 3 illustrates an example of a login transition screen.

FIG. 3 shows an example login transition screen 300 that can be displayed while the computer system is connecting to the virtual desktop, after a user has entered credentials 130 and prior to or without entering credentials 135. Login transition screen 300 is provided to mimic a similar screen that was displayed while a user natively logged into a local device.

Login transition screen 305 illustrates an example screen that is displayed when a user natively logs into their local or native desktop using credentials 135 corresponding to their local desktop. Notice, the two screens are similar.

The similarity between the different transition screens (300 and 305) brings a level of familiarity to the user and aids the user in understanding the login process. That is, one objective and benefit of the disclosed embodiments, to provide a new, yet familiar, login routine for users, where this new, yet familiar, routine matches or mimics the login routines that users are traditionally known to be familiar with. Providing the login transition screen 300 thus provides a familiar feel to a user who is now logging into a virtual desktop directly from the device's native login screen.

Figure 4:
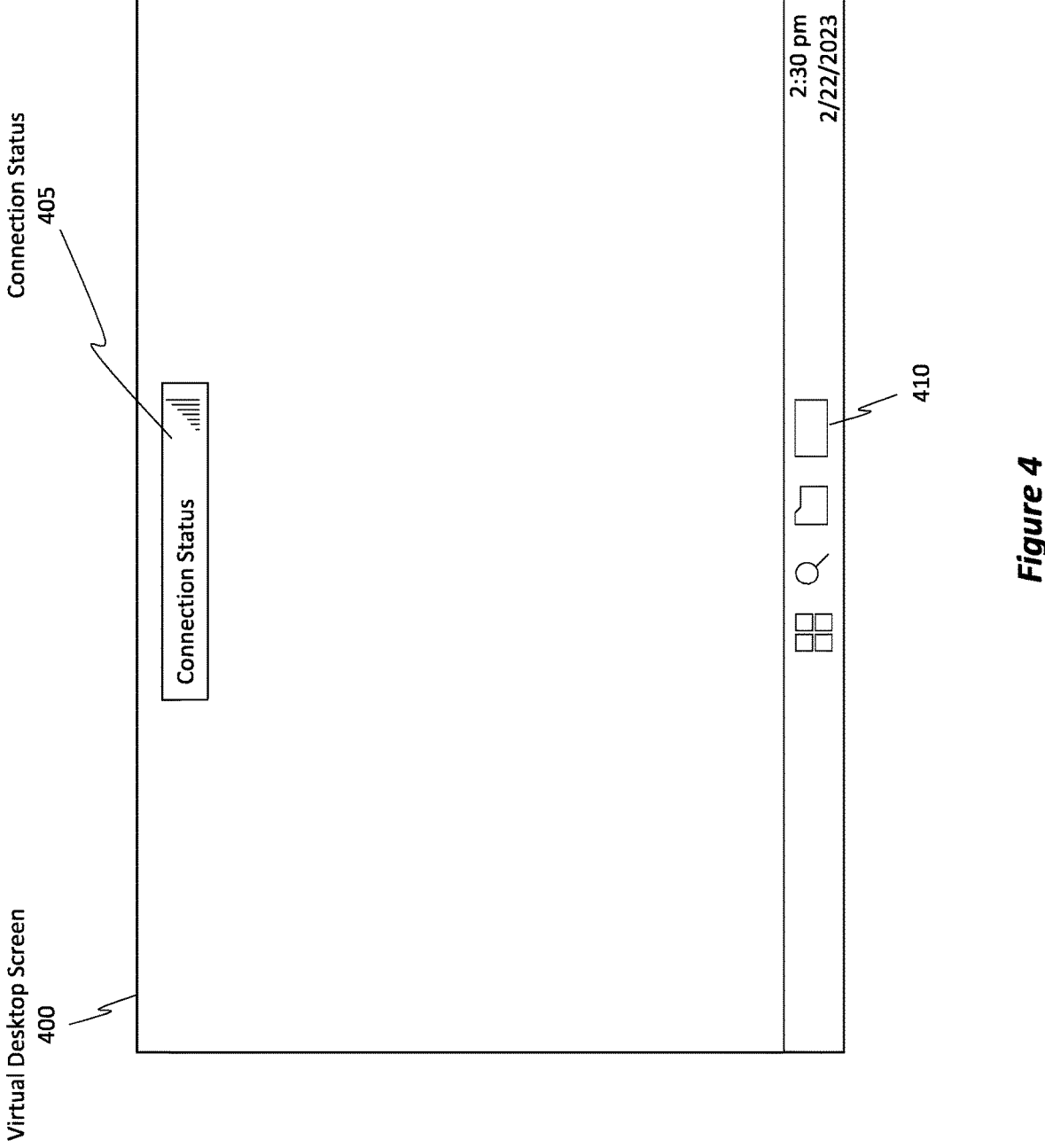
FIG. 4 illustrates an example of a streamed image of a virtual desktop's desktop.

FIG. 4 shows a streamed image of the desktop of the user's virtual desktop. That is, FIG. 4 is showing a virtual desktop desktop screen 400. This screen represents the desktop view of the user's virtual desktop after they have logged in with their virtual session credentials 300, and after those credentials have been validated by a remote service, such as the cloud service providing the virtual desktop session to the user.

The virtual desktop screen 400 can optionally include a user interface element (e.g., connection status 405) indicating the connection status between the local computer system and the remote server hosting the user's virtual desktop. Notice, the screen includes various features, such as a task bar, control features, folder or file options, and so on. As used herein, the term "desktop" refers to a primary display area of a computer system, where this display area provides options for a user to perform various actions using the computer's resources and where this display area provides a taskbar to enable the user to perform those desired actions.

Optionally, the virtual desktop screen 400 will provide a selectable link (e.g., link 410) that, when selected, will cause the system to display the initial login screen 200 (to receive different credentials for logging into a different virtual or local desktop experience).

Example Process Flow

Figure 5:
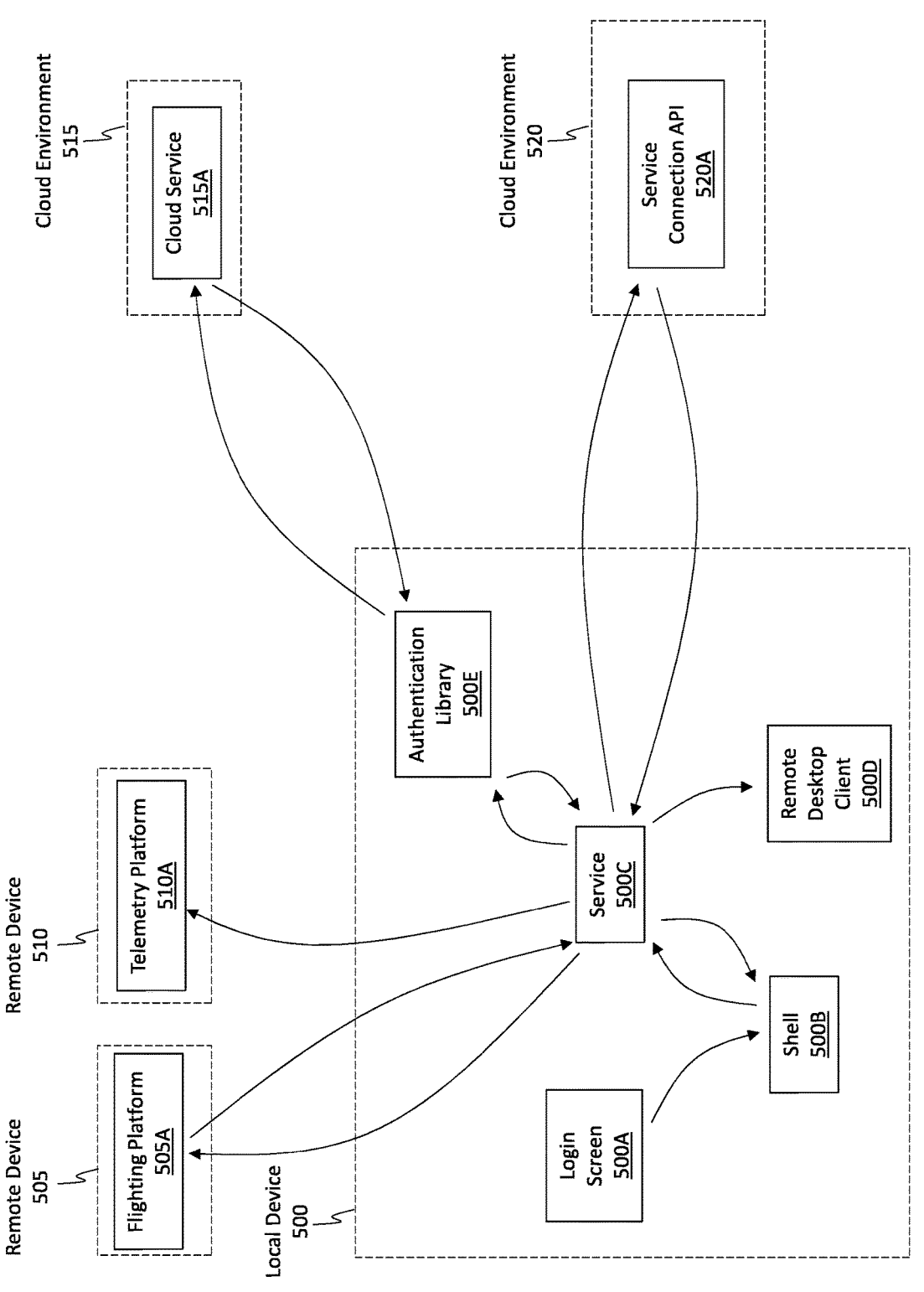
FIG. 5 illustrates an example process flow outlining some operations that can be performed to connect to a virtual desktop.

Having just described some of the principles at a high level, attention will now be directed to FIG. 5, which illustrates an example process flow of some of the communications and actions that can occur between a local device 500, one or more remote devices (e.g., remote devices 505 and 510), and one or more cloud environments (e.g., cloud environments 515 and 520). In some instances, the remote devices 505 and 510 may be the same device while in other instances they are different devices. Similarly, in some instances, the cloud environments 515 and 520 may be the same cloud environment while in other instances they are different environments.

Local device 500 displays a login screen 500A, which is representative of the login screen 200 of FIG. 2. This login screen 500A is provided by the local device's operating system. The user is expected to sign into a session by entering his/her credentials in the login screen 500A. In accordance with the disclosed principles, the local device 500 has been configured (e.g., by an IT administrator) to enable a "login-to-cloud" mode, which is the mode that enables the local device 500 to access the user's virtual desktop based on input provided in the login screen 500A. In some cases, various registry key settings may be modified and various shared policies may be set in place to facilitate this login-to-cloud mode.

In some cases, the credentials entered by the user on the login screen 500A are credentials associated with a cloud subscription the user has. Those same credentials can thus be used to trigger the connection between the local device 500 and the user's corresponding virtual desktop, or rather, those credentials can be used to validate or authenticate the user with the cloud service hosting the virtual desktop.

If the user does not have a pre-provisioned virtual desktop and if the user is not providing a license code, then the embodiments can make an initial determination that no virtual desktop exists or is otherwise available for this user. Based on that determination, the embodiments can then display an error message saying that the user does not have any virtual desktops assigned or any license assigned to that user's account. The user may then need to contact an IT administrator.

In most instances, the local device 500 is a type of terminal device or a public device that may be shared by multiple users. Often, the local device 500 is placed in a lockdown mode or a restricted mode. While in this mode, the local device 500 will typically prevent users from being able to locally log in to the local device 500. Instead, while this mode is active, users will be able to access only virtual desktops.

Thus, the local device 500 can be a dummy terminal or a device structured primarily for streaming purposes. Recall, the local device 500 receives a streamed image of the virtual desktop. The infrastructure that is hosting and supporting the virtual desktop is in the cloud environment. Thus, a majority of the compute, memory, and other operations are performed in the cloud, and the local device 500 can be a simplified device having, as its primary function, features related to streaming content.

Receiving the user credentials at the login screen 500A triggers the local device 500's shell 500B to initiate a login process. In accordance with the disclosed principles, the local device 500 is further configured to include a service 500C (aka a client application), which is representative of the service 105A from FIG. 5. The service 500C can be implemented as a part of the shell 500B or as an add-on to the shell 500B. In some cases, various APIs may exist to bridge the service 500C to the shell 500B.

The shell 500B is configured to call the service 500C and to inform the service 500C that a user is desirous to log in to his/her virtual desktop, based on the receipt of the user's credentials in the login screen 500A. Thus, the shell 500B can optionally activate the service 500C.

Service 500C calls an authentication library 500E. The authentication library 500E is tasked with acquiring a token for the user, where that token can be generated based on the entered user credentials. The authentication library 500E uses that token to validate the user with the cloud service 515A in the cloud environment 515. For instance, this validation can include determining that the user has a cloud subscription that includes a virtual desktop.

After a determination is made that the user is validated, the service 500C can then communicate with a service connection API 520A residing in the cloud environment 520. This service connection API 520A is tasked with identifying a particular virtual desktop for the user. For instance, it might be the case that the user has only a single virtual desktop, so that single virtual desktop is selected. In some cases, however, the user might be associated with multiple virtual desktops. Those multiple virtual desktops may be ranked. In some cases, the top ranked virtual desktop may be selected, and an image for that virtual desktop may be streamed to the local device 500. The ranking can be based on any parameter. For instance, the ranking may be based on historical usage of the user's virtual desktops, with the most used virtual desktop being the highest ranked virtual desktop. The ranking can also be based on features of the virtual desktops, compute availability of the virtual desktops, memory size of the virtual desktops, and so on.

After a virtual desktop for the user is identified, the service 500C communicates with a remote desktop client 500D. The remote desktop client 500D is tasked with launching a hosting application on the local device 500 and establishing a connection with the identified virtual desktop so that the image of that virtual desktop can be streamed to the local device 500.

In some alternative embodiments, the same user credentials used to log in to the local device can be used to log in to the virtual desktop. As one example, an IT administrator or user can configure one local PC account to log in locally and a different account to log in directly to the virtual desktop with local login credentials. After the local account is logged in, the configuration of that local account can determine if it is to continue on to automatically show the virtual desktop experience. In most cases, however, the user credentials for the local desktop login are different than the user credentials for the virtual desktop login.

In some cases, such as while an image of a virtual desktop is being streamed to the local device 500, the embodiments are able to connect with a flighting platform 505A, which may reside in the remote device 505, and a telemetry platform 510A, which may reside in the remote device 510. The flighting platform 505A can be used to determine what features are available to a given virtual desktop and a given user. In some instances, the flighting platform 505A can be viewed as a type of A/B test.

Generally, A/B testing refers to a process in which two (or perhaps more) versions of a feature are provided to a set of users. A first set of users is provided with the "A" version of the feature, and the second set of users is provided with the "B" version of the feature. The test collects data to see which version of the feature has a bigger impact on its respective set of users. The data is then used to drive various business decisions and, perhaps, even to drive the evolution of the feature and application. Thus, the flighting platform 505A can be used to enable various features on certain devices.

The telemetry platform 510A can be used to collect metric data or any type of telemetry data. This data can be used to provide feedback to better control the operations of the virtual desktop as well as the connection between the local device 500 and the virtual desktop. In some cases the telemetry data can also be used to determine how to resolve various issues, such as connection issues or issues that may occur when a break to the connection between the local device 500 and the virtual desktop occurs. As another example, the telemetry information can be used to determine what screen is to be displayed to a user when the connection to the virtual desktop breaks (e.g., perhaps the login screen will again be displayed again).

Reconfiguring the OS's Shell

The embodiments are able to reconfigure the OS's local shell. Thus, instead of starting up in a localized manner (e.g., by triggering the system's native explorer process, which is a process that shows a computer's taskbar, start menu, and other items on a desktop) when the user logs in, now the embodiments trigger a connection to be made to a virtual desktop and then stream an image of that virtual desktop to the local device. That is, the device is now configured to perform a different process during the login sequence, as discussed with regard to FIG. 5. Stated differently, the explorer process for the virtual desktop is triggered, and the desktop of the virtual desktop is displayed on the local device.

Figure 6:
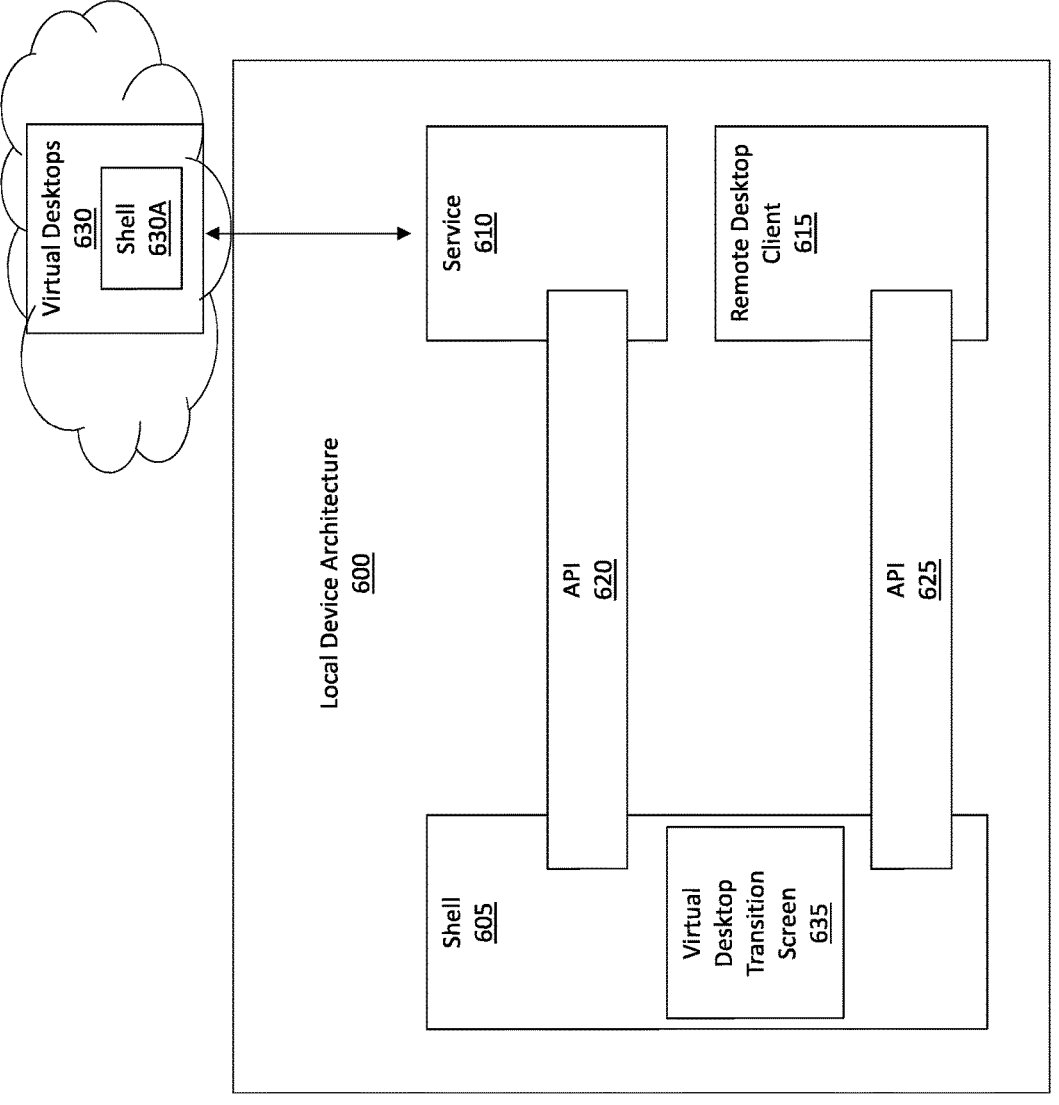
FIG. 6 illustrates an example architecture of a device that can connect to a virtual desktop.

FIG. 6 shows some additional details regarding how the service can interact with the shell. In particular, FIG. 6 shows a local device architecture 600, which refers to the architecture of the local device 500 of FIG. 5. The architecture is shown as including a shell 605, which corresponds to the shell 500B of FIG. 5, and a service 610, which corresponds to the service 500C. Furthermore, the architecture includes a remote desktop client 615, which corresponds to the remote desktop client 500D.

An API 620 is provided to facilitate communications between the shell 605 and the service 610. As used herein, the term "API" refers to a set of protocols that are used to enable one application to interact and engage with another application.

Similarly, an API 625 is provided to facilitate communications between the shell 605 and the remote desktop client 615. As described previously, the service 610 is tasked with identifying and connecting to various cloud desktops 630, or virtual desktops. Each virtual desktop is associated with its corresponding shell, as shown by shell 630A. During that connection phase, the shell 605 can trigger the display of a cloud desktop transition screen 635, which is representative of the login transition screen 300 of FIG. 3. Stated differently, the service 610 can optionally be registered with the shell 605, and the service 610 can be viewed by the shell 605 as being a PC, yet the service 610 is actually making a call to a different PC (i.e., the virtual desktop).

Generally, the shell 605 is operated by the device's OS. The shell 605 manages the cloud desktop transition screen 635. The shell 605 also cooperates with the service 610, which can optionally be a type of pluggable system, API, or component. After the user is logged in to the virtual desktop, the user is then instead interacting with the shell 630A of the virtual desktop 630. The virtual desktop's shell 630A displays a taskbar, start menu, and other control features directed to the control of the virtual desktop 630.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
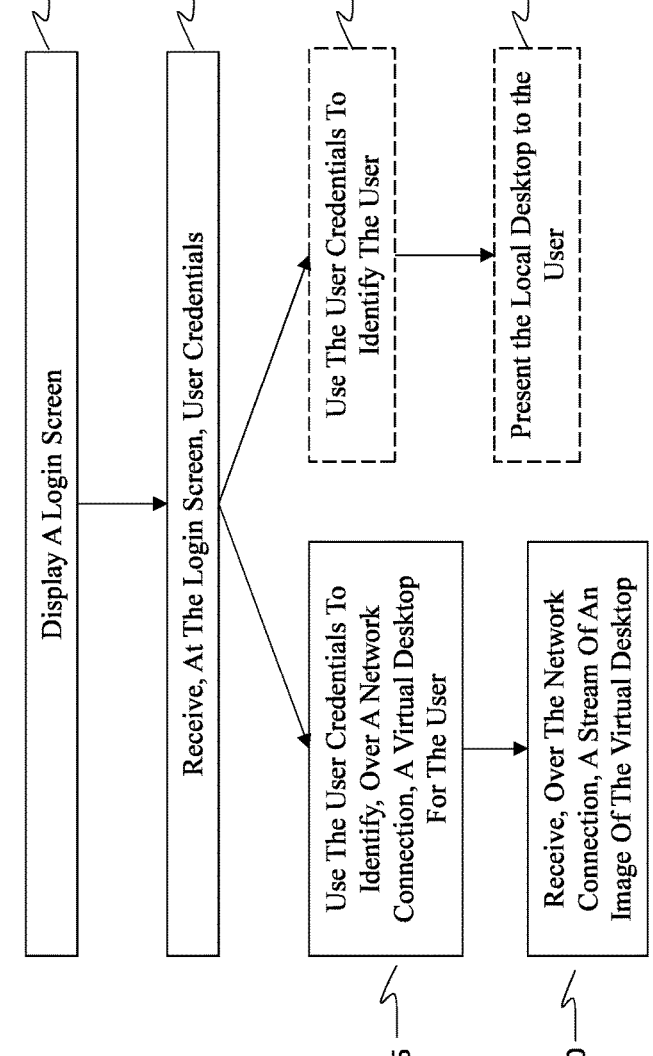

Attention will now be directed to FIG. 7, which shows a flowchart of an example method 700 for configuring a login screen, which is native to an OS of the computer system for enabling a user to log into their local desktop with a first set of credentials (e.g., credentials 135), to also enable a user to access a virtual desktop by entering a different set of credentials (e.g., credentials 130) corresponding to the virtual desktop that resides remotely in a cloud environment.

Method 700 can be implemented in the architecture 100 of FIG. 1, and more particularly by the device 105. Many of the acts can be implemented by the service 105A. Some of the acts may be implemented by the device OS 110, such as that OS's shell.

Method 700 includes an act (act 705) of causing a computer system to display a login screen. This login screen is native to the OS of the computer system. In some implementations, the computer system is operating in a lock down mode that prevents the user from locally logging in to the computer system. The OS of the computer system includes a shell application. A client service or application, which facilitates connection with the user's virtual desktop, is integrated with the shell application of the computer system's OS. For example, various APIs may exist to enable the service to communicate with the shell. The client service or application can optionally be registered so as to appear as being a PC by the OS to thereby enable the computer system to host a user session for the user, where the user session includes streaming an image of the user's virtual desktop.

Act 710 includes receiving, at the login screen, user credentials. In some instances, the user credentials are for the virtual desktop associated with the user who entered the user credentials. The term "associated" should be interpreted broadly. For instance, in one scenario, the user credentials may comprise a username and password. In this example case, there may be a pre-provisioned virtual desktop that can be accessed using the username and password. In some implementations, the user credentials may include a license code. In this case, there may not be a pre-provisioned virtual desktop for the user. The user may then be provided access to a virtual desktop that is currently being provisioned for the user in real time based on the usage of the license code. Both of these examples describe scenarios in which a virtual desktop is or can be "associated" with the user. This association may be a pre-existing association or one that is created at the time the user provides the user credentials (e.g., the license code).

Act 715 includes using the user credentials (e.g., credentials 130) to identify, over a network connection, the virtual desktop for the user. The virtual desktop resides in a cloud environment, which is remote relative to the computer system. The identification process can involve initially validating or authenticating that the user has a cloud subscription. If the user has a cloud subscription, then the embodiments may check whether a virtual desktop exists for the user. It might be the case that the user is associated with multiple virtual desktops. The embodiments, as discussed previously, are able to intelligently select a particular virtual desktop to stream to the user's device.

Act 720 includes receiving, over the network connection, a stream of an image of the virtual desktop. This occurs after the user's credentials for the virtual desktop are validated by the remote cloud service. Recall, the virtual desktop resides in the cloud environment, but the virtual desktop is/was accessed via the computer system's login screen. Thus, the system's streaming functionality is used to receive the stream from the cloud service hosting the virtual desktop.

In some cases, the computer system is a shared terminal usable by multiple users. The computer system can thus enable each of the users to log in to that user's corresponding virtual desktop from the login screen, which is native to the OS of the computer system. In some cases, the computer system is governed by a shared mode policy, which controls or governs what features or options are available to users using the computer system. Regarding that control, some embodiments select a registry key setting of the computer system to enable the computer system to facilitate connecting with the virtual desktop from the login screen, thereby providing an option to login-to-cloud. In some cases, a local login feature of the computer system is disabled to prevent users from locally logging into the system.

Method 700 may include additional acts. For instance, one act includes causing, in response to receiving the user credentials at the login screen, the OS shell to call a service (e.g., the service 105A of FIG. 1, service 500C of FIG. 5, or service 610 of FIG. 6) residing on the computer system. Another act can include causing the service to obtain a token for the user. The service may then use the token to validate the user with the cloud environment. In response to validation of the user, the service may then trigger the identification of the virtual desktop in the cloud environment.

Another act may include providing flighting information to a first remote service, device, or platform. The flighting information details which features associated with the virtual desktop and/or connection to the virtual desktop are enabled for the user.

Another act may include providing telemetry data to a second remote service, device, or platform. Optionally, the second remote service may be the same as the first remote service. The telemetry data is usable to determine what conditions resulted in an error. For instance, a condition may occur where the connection between the device and the virtual desktop is broken or otherwise terminated. The telemetry data can detail why this event occurred. The telemetry data can also be relied on to determine what subsequent screen is to be presented to the user (e.g., perhaps display the login screen).

As mentioned previously, in some implementations, the user may be associated with multiple virtual desktops. The identified virtual desktop may be the one that is determined to be a top ranked virtual desktop for the user. The ranking may be based on past usage of the virtual desktop by the user. The ranking may be based on compute power that is available to the various virtual desktops. The ranking may be based on memory size that is available to the various virtual desktops. The ranking can be based on any combination of the above aspects and/or any other ranking criteria.

In some cases, a type for the OS of the computer system might be different than a type of an OS for the virtual desktop. For instance, the computer system might have a first type of OS (e.g., Windows) while the virtual desktop might have a second type of OS (e.g., Linux).

Optionally, various peripheral devices of the computer system can be controllable through a desktop of the virtual desktop. That is, even though the virtual desktop is operating in the infrastructure provided by the cloud environment, some embodiments allow the shell of the virtual desktop (e.g., shell 630A) to communicate with the shell of the local device (e.g., shell 605) to enable the virtual desktop's shell to control the local system's peripheral devices. As some examples, the peripheral devices may include one or more of a mouse, a keyboard, a speaker, a microphone, a display, or any other type of peripheral device. Thus, the user can control the local peripheral devices connected to the local device from the taskbar of the desktop of the virtual desktop.

The embodiments further allow a user to control various other features of the local device through that user's virtual desktop. For instance, it might be the case that the local device receives an update, such as an OS update. It is often the case that when such an update occurs, the local device is required to reboot. That reboot would interrupt the user's interaction with the virtual desktop. In accordance with the disclosed principles, the embodiments are configured to enable a user to manage, schedule, or otherwise direct various local device operations via the virtual desktop, where those local operations include controlling the local device's updates, controlling the local device's peripheral devices (e.g., Bluetooth devices, speakers, mouse, keyboard), or any other type of connected device. In this regard, the embodiments are able to integrate the local PC settings with the virtual desktop, particularly for managing functions such as OS updates, additional connected devices, or even display settings. Such operations can optionally be controlled through the remote desktop protocol (RDP) or through a cloud service. Such a feature is particularly advantageous in scenarios where users are unable to interact with these settings through the local PC because the user is not logging into the local PC.

FIG. 7 also illustrates how the user can, alternatively, access their local desktop (act 730) by providing credentials that identify the user to the local device (act 725). These steps are shown in dashed boxes to illustrate how they might not be performed if the user credentials are for the virtual desktop. In this regard, a single entry point or login screen can be used to facilitate a user controllably accessing either their local desktop or, alternatively, their virtual desktop from that single login screen, solely dependent upon which set of credentials they provide (e.g., credentials 130 for the virtual desktop or credentials 135 for the local desktop).

FIG. 8 shows a flowchart of an example method 800 for configuring a login screen, which is native to an OS of a computer system, to enable a user to access a virtual desktop that is residing in a cloud environment. Method 800 can also be implemented by the device 105 of FIG. 1.

Act 805 of method 800 includes causing the computer system to display the login screen. As indicated above, this login screen is native to the OS of the computer system.

Act 810 includes receiving, at the login screen, user credentials. The user credentials are for the virtual desktop associated with the user who entered the user credentials. As described previously, this association may be a pre-existing association or one that is created at the time the user provides the user credentials (e.g., the license code). The user credentials can be one or more of (i) a username and password, (ii) a license code, or (iii) a QR code.

Act 815 includes causing a first application shell (e.g., shell 500B of FIG. 5) of the computer system's OS to activate an application service (e.g., service 500C) or client. The service is tasked with identifying, over a network connection, the virtual desktop for the user. The virtual desktop resides in the cloud environment.

Act 820 includes receiving, over the network connection, a stream of an image of the virtual desktop. The virtual desktop resides in the cloud environment, but the virtual desktop was accessed via the computer system's login screen.

Act 825 includes providing user access to a second application shell (e.g., shell 630A), which is associated with an OS of the virtual desktop. This interaction occurs using a remote connection that exists between the computer system and the virtual desktop and that was established as a result of the user entering the user credentials at the login screen. The interaction can involve the user interacting with the desktop's taskbar or any other application, control feature, or other feature provided by the virtual desktop.

In some embodiments, method 800 can include a further act of displaying a login transition screen during a time while the computer system is connecting to the virtual desktop. Optionally, the login transition screen can have a threshold level of similarity relative to a login transition screen that would otherwise be displayed if the user were locally logging in to the computer system. As one non-limiting example, the login transition screen may be substantially the same as a traditional login transition screen except for the display of a cloud element in the interface (e.g., as shown in FIG. 3) to enable the user to recognize that the login process is being performed with respect to the user's virtual desktop.

Accordingly, the disclosed embodiments are directed to integrating the connection to a virtual desktop into an operating system of a local device. This integration is achieved by providing a dynamic login process that allows users to log in to a virtual desktop from the login screen of the local device. In this regard, users are able to log directly into the virtual desktop as the primary operating system experience on a device. Conventional solutions, such as kiosk mode, are generally meant to be operated locally and for a specific set of actions or tasks. In contrast, the present techniques bring the user directly to a cloud-based platform without necessarily showing any local client application (e.g., remote desktop application).

Example Computer/Computer Systems

Figure 9:
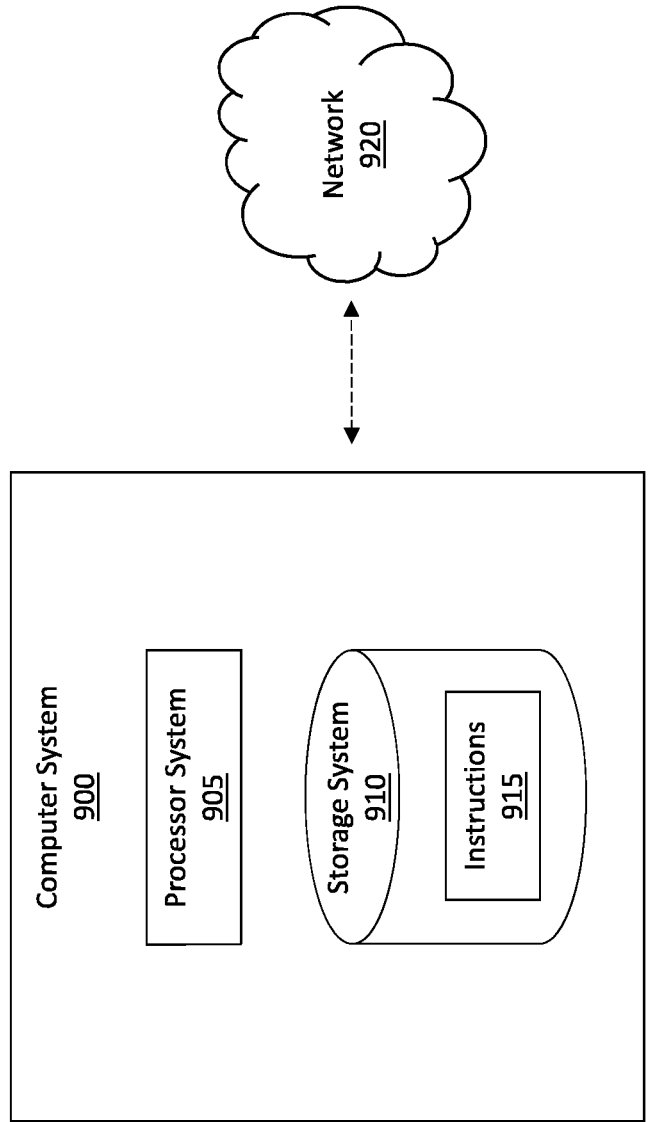
FIG. 9 illustrates an example computer system that can be configured to perform any of the disclosed operations.

Attention will now be directed to FIG. 9 which illustrates an example computer system 900 that may include and/or be used to perform any of the operations described herein. Computer system 900 may take various different forms. For example, computer system 900 may be embodied as a tablet, a desktop, a laptop, a mobile device, or a standalone device, such as those described throughout this disclosure. Computer system can be implemented as the device 105 from FIG. 1. Computer system 900 may also be a distributed system that includes one or more connected computing components/devices that are in communication with computer system 900.

In its most basic configuration, computer system 900 includes various different components. FIG. 9 shows that computer system 900 includes a processor system 905 comprising one or more processor(s) (aka a "hardware processing unit") and a storage system 910 comprising one or more hardware storage devices that store instructions that are executable by the processor system 905.

Regarding the processor(s) of the processor system 905, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 900. The different components, modules, engines, and services described herein may be implemented as objects or processors that execute on computer system 900 (e.g. as separate threads).

Storage system 910 may include physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

Storage system 910 is shown as including executable instructions 915. The executable instructions 915 represent instructions that are executable by the processor(s) of computer system 900 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 900 may also be connected (via a wired or wireless connection) to external sensors (e.g., one or more remote cameras) or devices via a network 920. For example, computer system 900 can communicate with any number devices or cloud services to obtain or process data. In some cases, network 920 may itself be a cloud network. Furthermore, computer system 900 may also be connected through one or more wired or wireless networks to remote/separate computer systems(s) that are configured to perform any of the processing described with regard to computer system 900.

A "network," like network 920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that facilitates user access to a virtual desktop, said computer system comprising:
a processor system; and
a memory storage system comprising instructions that are executable by the processor system to cause the computer system to:
display a login screen, which is native to an operating system (OS) of the computer system;
receive, at the login screen, user credentials from a user;
determine that the user is associated with multiple virtual desktops, each of which has a corresponding ranking relative to one another and each of which is provisioned in a cloud environment;
determine that the virtual desktop has a highest ranking among the multiple virtual desktops;
determine that the user credentials are likely for the virtual desktop based on the virtual desktop having the highest ranking;
prior to receiving a stream of an image of the virtual desktop over a network connection, display a login transition screen during a time when the computer system is connecting to the virtual desktop, wherein the login transition screen has a threshold level of similarity relative to a native login transition screen that would otherwise be displayed if a local login process were being performed, and wherein the login transition screen includes at least one user interface element that is different relative to the native login transition screen; and
receive, over the network connection, the stream of the image of the virtual desktop; and
provide flighting information details to a first remote service, wherein the flighting information details which features associated with the virtual desktop and/or connection to the virtual desktop are enabled for the user.

2. The computer system of claim 1, wherein the computer system is operating in a lock down mode that prevents the user from locally logging in to the computer system.

3. The computer system of claim 1, wherein the computer system is a shared terminal usable by multiple users, and wherein the computer system enables each of the users to log in to said each user's corresponding virtual desktop from the login screen that is native to the OS of the computer system.

4. The computer system of claim 1, wherein the computer system is governed by a shared mode policy.

5. The computer system of claim 1, wherein a registry key setting of the computer system is selected to enable the computer system to facilitate connecting with the virtual desktop from the login screen.

6. The computer system of claim 1, wherein execution of the instructions further causes the computer system to:
in response to receiving the user credentials at the login screen, cause a shell of the OS of the computer system to call a service residing on the computer system;
cause the service to obtain a token for the user;
cause the service to use the token to validate the user with a cloud environment; and
in response to validation of the user, cause the service to trigger the identification of the virtual desktop in the cloud environment.

7. The computer system of claim 6, wherein execution of the instructions further causes the computer system to:
provide telemetry data to a second remote service, wherein the telemetry data is usable to determine what conditions resulted in an error.

8. The computer system of claim 1, wherein:
the OS of the computer system includes a shell,
a client service, which facilitates connection with the user's virtual desktop, is integrated with the shell of the computer system's OS, and
the client service is registered so as to appear as being a personal computer (PC) by the OS to thereby enable the computer system to host a user session for the user, where the user session includes streaming the image of the virtual desktop.

9. The computer system of claim 1, wherein the user credentials comprise a username and password, and wherein the virtual desktop was pre-provisioned for the user.

10. The computer system of claim 1, wherein the user credentials comprise a license code, and wherein the virtual desktop is not pre-provisioned for the user.

11. The computer system of claim 1, wherein the rankings of the multiple virtual desktops are based on a historical usage of the multiple virtual desktops by the user.

12. The computer system of claim 1, wherein the rankings of the multiple virtual desktops are based on compute availabilities of the multiple virtual desktops.

13. The computer system of claim 1, wherein the rankings of the multiple virtual desktops are based on memory sizes of the multiple virtual desktops.

14. A method for accessing a virtual desktop, said method comprising:
causing a computer system to display a login screen, which is native to an operating system (OS) of the computer system;
receiving, at the login screen, user credentials from a user;
determining that the user is associated with multiple virtual desktops, each of which has a corresponding ranking relative to one another and each of which is provisioned in a cloud environment;
determining that the virtual desktop has a highest ranking among the multiple virtual desktops;
prior to receiving a stream of an image of the virtual desktop over a network connection, displaying a login transition screen during a time when the computer system is connecting to the virtual desktop, wherein the login transition screen has a threshold level of similarity relative to a native login transition screen that would otherwise be displayed if a local login process were being performed, and wherein the login transition screen includes at least one user interface element that is different relative to the native login transition screen; and receiving, over the network connection, the stream of the image of the virtual desktop; and providing flighting information details to a first remote service, wherein the flighting information details which features associated with the virtual desktop and/or connection to the virtual desktop are enabled for the user.

15. The method of claim 14, wherein a type for the OS of the computer system is different than a type of an OS for the virtual desktop.

16. The method of claim 14, wherein peripheral devices of the computer system are controllable through a desktop of the virtual desktop.

17. The method of claim 16, wherein the peripheral devices include one or more of a mouse, a keyboard, a speaker, a microphone, or a display.

18. The method of claim 14, wherein a local login feature of the computer system is disabled.

19. A method for accessing a virtual desktop, said method comprising:

causing a computer system to display a login screen, which is native to an operating system (OS) of the computer system;

receiving, at the login screen, user credentials from a user;

causing a first application shell of the computer system's OS to activate a service, which is tasked with identifying, over a network connection, the virtual desktop for the user, wherein the virtual desktop resides in a cloud environment;

determining that the user is associated with multiple virtual desktops, each of which has a corresponding ranking relative to one another and each of which is provisioned in the cloud environment;

determining that the virtual desktop has a highest ranking among the multiple virtual desktops;

prior to receiving a stream of an image of the virtual desktop over the network connection, displaying a login transition screen during a time when the computer system is connecting to the virtual desktop, wherein the login transition screen has a threshold level of similarity relative to a native login transition screen that would otherwise be displayed if a local login process were being performed, and wherein the login transition screen includes at least one user interface element that is different relative to the native login transition screen;

receiving, over the network connection, the stream of the image of the virtual desktop, which resides in the cloud environment but which was accessed via the computer system's login screen; and providing user access to a second application shell, which is associated with an OS of the virtual desktop, wherein said user access occurs using a remote connection that exists between the computer system and the virtual desktop and that was established as a result of the user credentials being entered at the login screen; and providing flighting information details to a first remote service, wherein the flighting information details which features associated with the virtual desktop and/or connection to the virtual desktop are enabled for the user.

20. The method of claim 19, wherein the user credentials is one of (i) a username and password, (ii) a license code, or (iii) a quick response (QR) code.

\*    \*    \*    \*    \*